United States Patent
Yan et al.

(10) Patent No.: US 6,525,846 B1
(45) Date of Patent: Feb. 25, 2003

(54) WAVELENGTH DIVISION MULTIPLEX/ DEMULTIPLEXING DEVICE

(75) Inventors: Dapeng Yan, Pleasanton, CA (US); Gong-en Gu, Pleasanton, CA (US); Yiqing Zhu, Pleasanton, CA (US); William D. Sterling, Dublin, CA (US)

(73) Assignee: Aoc Technologies, Inc., Dublin, CA (US)

( * ) Notice: Subject to any disclaimer, the term of this patent is extended or adjusted under 35 U.S.C. 154(b) by 3 days.

(21) Appl. No.: 09/702,137

(22) Filed: Oct. 31, 2000

Related U.S. Application Data
(60) Provisional application No. 60/235,316, filed on Sep. 26, 2000.

(51) Int. Cl.[7] .............................. G02B 5/32; G03H 1/24; G03H 1/26; H04J 14/02
(52) U.S. Cl. ............................... 359/15; 359/22; 359/24; 359/566; 359/129; 359/130; 359/124; 359/900
(58) Field of Search .................................. 359/558, 566, 359/569, 576, 579, 15, 129, 130, 634, 22, 24, 124, 127, 900; 385/37, 24

(56) References Cited

U.S. PATENT DOCUMENTS 5,970,190 A  * 10/1999  Fu et al. ........................ 385/37

* cited by examiner

Primary Examiner—John Juba, Jr.
(74) Attorney, Agent, or Firm—Howard Cohen

(57) ABSTRACT

A wavelength division multiplexing device and method includes two prisms having a pair of coated, highly reflective opposed faces forming an etalon. A volume phase grating is sandwiched between the two prisms. The volume phase grating is positioned between the highly reflective opposed face portions so that a light beam incident on the etalon undergoes a preselected number of multiple reflections between the highly reflective face portions and a preselected number of traversals through the volume diffraction grating, whereby wavelengths satisfying a Bragg condition on each traversal are diffracted out of the volume grating means. One prism may be designed to separate TE and TM polarized light, and the other prism may be designed to combine the TE and TM modes so that the result is polarization independent. Each prism includes at least one transparent output face through which the separately diffracted wavelengths are transmitted at respective angles. An array of detectors is disposed at the output face to received the separately diffracted wavelengths.

24 Claims, 3 Drawing Sheets

WAVELENGTH DIVISION MULTIPLEX/DEMULTIPLEXING DEVICE

REFERENCE TO RELATED APPLICATION

This application claims priority based on Provisional Application No. 60/235,316, filed Sep. 26, 2000.

BACKGROUND OF THE INVENTION

Wavelength division multiplexing (WDM) devices are becoming increasing important in fiber-optics sensing system and optical communication systems to enhance transmission capacity and application flexibility. The use of WDM technologies not only provides high speed optical communication links, but also provides advantages such as higher data rates, format transparency, and self-routing (S. Wagner, H. Kobrinski, "WDM applications in broadband telecommunication networks," IEEE Communications Magazine, March, P.22, 1989. L. S. Lome, J. Morookian, S. Monacos, and L. A. Bergman, "WDM requirements for high performance testbeds," SPIE, Vol.2690, P.2, 1996) Over the past twenty years, many kinds of WDM device technologies have been developed and demonstrated. WDM device using dispersion photopolymers, arrayed-waveguide gratings (AWG's) and dichromated gelatin (DCG) volume holographic gratings have been recently reported. For example see the publications:

[1] G. Georgiou, and A. Boucouvalas, "High-isolation single-mode wavelength-division multiplexer/demultiplexer," Electronics Letters, Vol.22, No.2, P.62, 1986.

[2] E. Acosta and K. Iga, "Design of a wavelength multiplexer-demultiplexer by the use of planar microlenses," Applied Optics, Vol.19, No.16, P.3415, 1994.

[3] K. Okamoto, K. Syuto, H. Takahashi and Y. Ohmori, "Fabrication of 128-channel arrayed waveguided grating multiplexer with 25 GHz channel spacing," Electronics Letters, Vol.32, No.16, P.1474, 1996.

[4] E. J. Lerner, "Multiple wavelength exploit fiber capacity," Laser Focus World, Vol.33, No.7, P.119, 1997.

[5] Y. Huang, D. Su and Y. Tsai, "Wavelength-division-multiplexing and demultiplexing by using a substrate-mode grating pair," Optics Letters, Vol.17, No.22, P.1629, 1992.

[(6] M. R. Wang, G. J. Sonek, R. T. Chen and T. Jannson, "Large fanout optical interconnects using thick holographic gratings and substrate wave propagation," Applied Optics, Vol.31, No.2, P.236, 1992.

[7] M. M. Li and R. T. Chen, "Two-channel surface-normal wavelength division demultiplexer using substrate guided waves in conjunction with multiplexed waveguide holograms," Applied Physics Letters, Vol.66, No.3, P.262, 1995.

[8] M. M. Li and R. T. Chen, "Five-channel surface-normal wavelength division demultiplexer using substrate guided waves in conjunction with a polymer-based littrow hologram." Optics Letters, Vol.20, No.7, P.797, 1995.

It would be very advantageous to provide a WDM device exhibiting high angle of incidence on the grating necessary to satisfy the Bragg condition for 1550 nm center wavelength and 1852 lines/mm grating frequency, high element dispersion at the high wavelength end of its spectral bandwidth and polarization independent response.

SUMMARY OF THE INVENTION

It is an object of present invention to provide a wavelength division multiplexing device of simple construction with dual-functionality of wavelength selection and beam splitting. It is also an object of the present invention to provide a wavelength division multiplexing device that is polarization independent.

The present invention provides a wavelength division multiplexing device comprising two prisms having a pair of coated, highly reflective opposed faces forming an etalon. A volume phase grating is sandwiched between the two prisms. The volume phase grating is positioned between the highly reflective opposed face portions so that a light beam incident on the etalon undergoes a preselected number of multiple reflections between the highly reflective face portions and a preselected number of traversals through the volume diffraction grating, whereby wavelengths satisfying a Bragg condition on each traversal are diffracted out of the volume grating means.

In this aspect of the invention the two prisms may have the same parameters, and the input side of the first prism and opposed side of second prism have highly reflective surfaces to form a etalon, the volume grating sandwiched between the two prisms.

In another aspect of the invention the prisms may be may be formed of infrared transmitting material such as ZnSe for 1550 nm center wavelength or BK-7 material for visible light.

In another aspect of the invention the volume grating may be a conventional single Bragg grating, multiple superimposed Bragg gratings or binary Bragg supergratings. Because the grating is sandwiched between the two prisms, a protective cover glass is not required to prevent water vapor from affecting the sensitive film and to protect the grating from contaminants.

The two prisms may have two sides, one side with a highly reflective surface for internal reflection and an opposed side for output of the diffraction beam.

In a further aspect of the invention there is provided a method of wavelength division multiplexing. The method comprises providing a volume diffraction means between an input face and an opposed reflecting face to multiply reflect a beam of light through the volume grating means for a preselected number of traversals, with each traversal of the beam through the volume grating means being in a different preselected direction whereby light satisfying a Bragg condition during the traversals is diffracted in a direction different from light diffracted during other traversals through the volume grating means. The method includes detecting light diffracted in the different direction for each traversal of the light beam through the volume grating means. In this aspect of invention two faces are formed by refractive prisms. With them, extraordinary polarized and ordinary polarized light can be separated and combined.

In another aspect of the invention there is provided a method of wavelength division multiplexing. The method comprises providing a volume diffraction means between two reflective faces of two prisms disposed at a preselected angle such that the reflective faces are parallel with respect to one another. The two reflective faces reflect a beam of light through the volume diffraction grating means for a preselected number of traversals, with each traversal of the beam through the volume diffraction grating means being in a different preselected direction, whereby light satisfying a Bragg condition during the traversals is diffracted in a direction different from light diffraction during other traversals through the volume diffraction grating means. The method includes detecting light diffraction in different direction for each traversal of the light beam through the volume diffraction grating means.

DESCRIPTION OF THE PREFERRED EMBODIMENT

Figure 1:
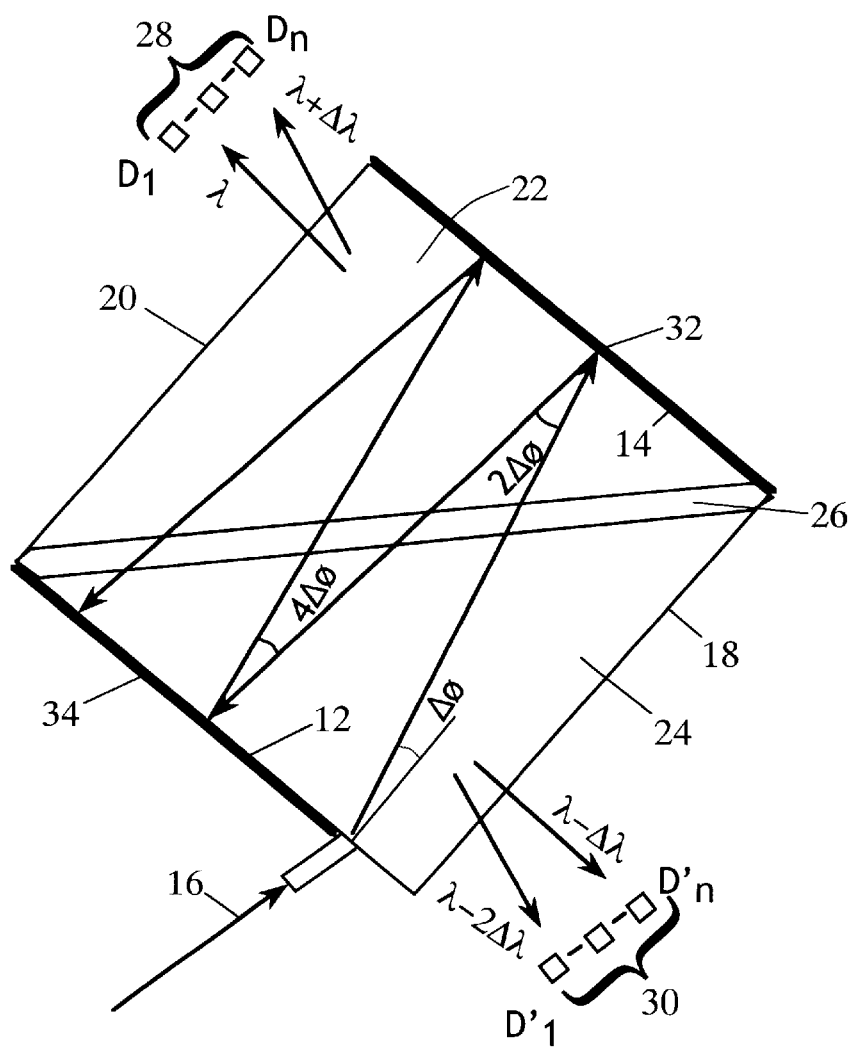
FIG. 1 is a cross sectional view of one example of a grating disposed between two prisms constructed in accordance with the present method.

The present invention generally comprises a wavelength division multiplexing (WDM) device that employs a volume grating. Referring first to FIG. 1, the WDM functionality of the device is achieved by passing a multiple-wavelength input light beam through the same grating region at different carefully chosen directions. As shown in FIG. 1, at different incident directions, different wavelengths can satisfy the Bragg condition. Only the wavelength with the proper Bragg parameters will be efficiently diffracted. If incident light of wavelength $\lambda$ satisfies the Bragg condition, and the angle between the grating vector and the incident wave vector is $\beta$, when this angle slightly changes to $\theta+\Delta\theta$, the selected wavelength will change to $\lambda+\Delta\lambda$.

The WDM device includes two prisms 22 and 24 comprising a input face 12 and opposed face 14. Faces 12 and 14 have highly reflective portions 32 and 34, respectively, that may be formed by a reflective metal coating. The term two prisms as used herein refers to devices having generally the same configurations and dimensions and comprising highly reflective input face 12 for the first prism and parallel opposed face 14 for second prism. WDM device includes a volume grating 26 sandwiched between the two prisms 22 and 24. In addition, the two prisms may be dispersive to avoid problem associated with polarization dependence. Likewise, one prism may be designed to separate TE and TM polarized light, and the other prism may be designed to combine the TE and TM modes so that the result is polarization independent. Techniques for creating these polarization effects are known in the prior art. The grating structure 26 may comprise a conventional single Bragg grating, or multiple superimposed Bragg gratings, or a binary Bragg supergrating and volume phase grating. Because the grating is sandwiched between the two prisms, a protective cover glass is not required to prevent water vapor from affecting the sensitive film and to protect the grating from contaminants.

The WDM device includes a mechanism 16 for adjusting the waveguide of incident light at a small angle $\Delta\theta$ with respect to an axis normal to the parallel faces 12 and 14. A wavelength sensitive detector array 28 includes detectors $D_1$ to $D_n$ positioned to intercept the beams diffracted out of one side of volume grating 26 at respective different angles, and another detector array 30 includes detectors $D'_1$ to $D'_n$ at the opposed side of the grating, with each positioned to intercept a particular wavelength diffracted out of the grating.

Figure 2:
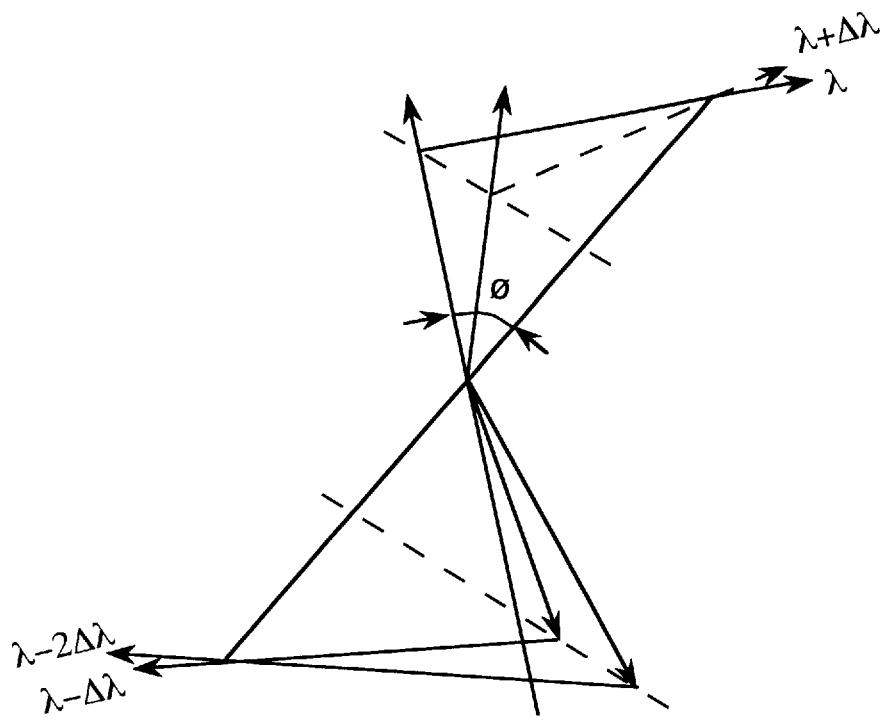
FIG. 2 illustrates the principle of a multiple pass Bragg grating structure for WDM application.

After the first pass of the input beam 16 through grating 26 the light having wavelengths satisfying the Bragg condition $\lambda - n\Delta\lambda$ (n=1,2,...) is diffracted and this light exits the device as see in FIG. 1 through the non-reflecting side 18 to be intercepted and detected by a detector in array 30. The beam containing wavelengths not diffracted continues to propagate through grating 26 towards the face 14 and is back-reflected into grating 26 but at an angle of $(+2\Delta\theta)$. The beam again propagates back through grating 26 but because it traverses through grating 26 at a different angle, the Bragg condition is changed so that different wavelengths $\lambda+n\Delta\theta$ are diffracted and exit the side 20. These diffracted beams are intercepted and detected by detectors in array 28. The undiffracted beam propagates through grating 26 and is back-reflected from reflective portion 34 at an angle $+2\Delta\theta$ with respect to the original input angle. This process is repeated until the last wavelength is diffracted. The wavelength selectivity is given by:

$$\Delta\lambda/\lambda = \tan(\theta/2)\Delta\theta$$

where $\theta$ as it is shown in FIG. 2 is the angle between the input wave vector and the grating wave vector. For example, in the case of $\lambda=1.5$ μm, $\Delta\lambda=2.0$ nm, we get $\Delta\theta=0.21°$.

The volume or Bragg grating may be fabricated from polymers, glass, semiconductor materials such as GaAs, Si, ZnSe, or the like. It will be understood that the choice of material from which the volume grating is produced will depend on the wavelength region in which the WDM device is to operate. A viable volume grating must be fabricated by using materials that transmit light in the wavelength region of interest.

Detector arrays 28 and 30 are located with respect to output faces 18 and 20 respectively to intercept the separated beam of differing wavelengths. The detector array may be mounted (or fabricated) directly on the substrate at the output faces or may be separate and spaced from the substrate.

Figure 3:
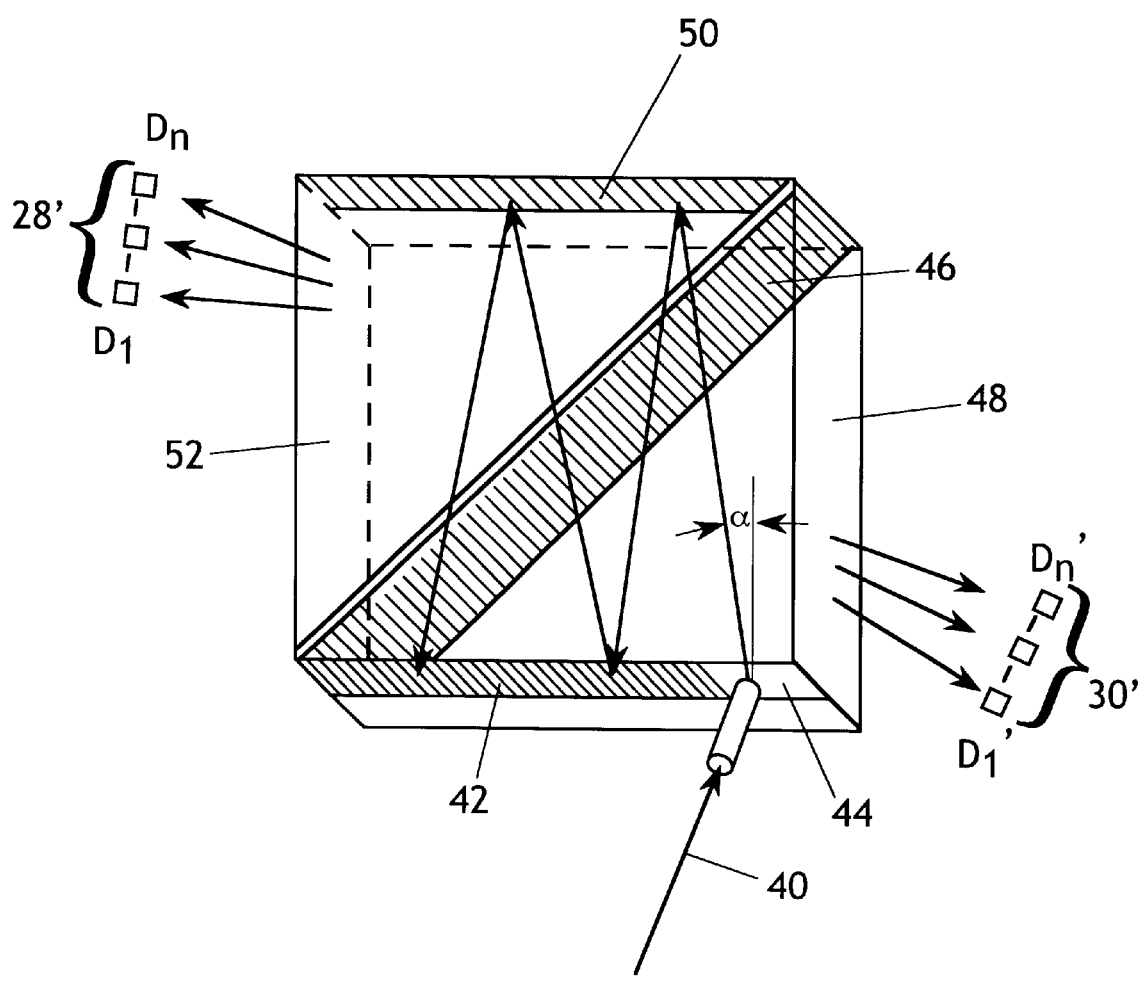
FIG. 3 is a perspective view of an alternative embodiment of a grating in two prisms.

In operation, shown in FIG. 3, a light beam 40 is directed by waveguide 42 through the antireflection coated input portion 44. After a first pass of the input beam through the grating region 46 at an angle $\alpha$, light having a wavelength that satisfies the Bragg condition is diffracted and propagates out through output face 48 to detector $D_1'$ in detector array 30'. The rest of the beam continues to propagate toward the face 50 and is reflected back into the grating region 46, but this time at an angle of $-(\alpha-2\phi)$. Due to the different incident angle, in the second pass, light of a slightly different wavelength is diffracted and propagates out through output face 52 into detector $D_1$ in detector array 28'. The remainder of the light beam propagates back toward face portion 42 and is reflected back at an angle $\alpha-2\Delta\phi$ with the diffracted beam being detected by detector $D_2'$. This process is repeated until the last qualified wavelength is diffracted.

Figure 4:
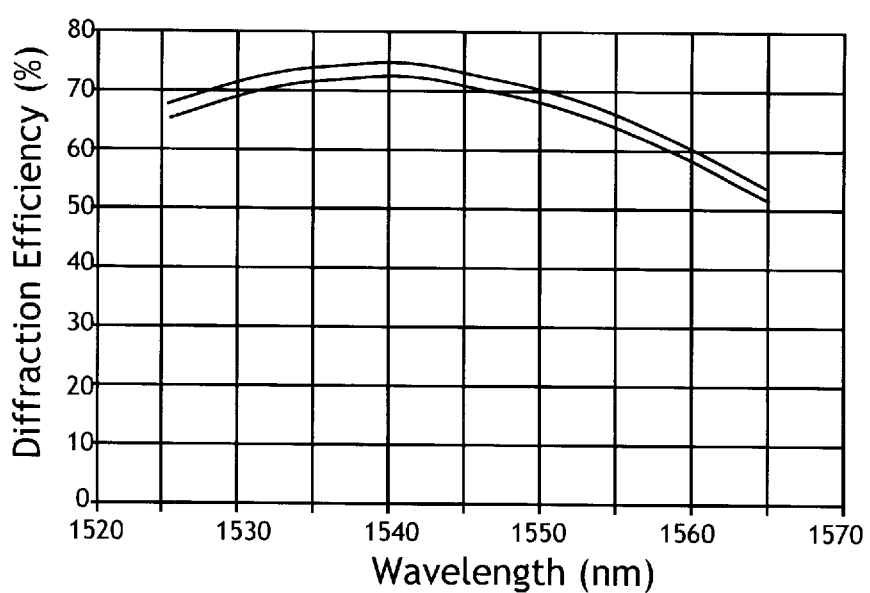
FIG. 4 is a plot of diffraction efficiency versus wavelength for the output passband spectrum of a grating between the two prisms.

FIG. 4 illustrates the output passband spectrum after two passes through a set of 20 grating written on $LiNbO_3$ crystal in which forty wavelength channels spaced 2 nm apart were successfully demultiplexed from a common input port. The two plots represent the outputs of two different designs. The significant advantage of the present invention is that the number of demultiplexed channels doubles that of the original with two passes. The diffraction efficiencies can be adjusted by varying the grating strength.

The diffraction efficiencies and wavelength resolution of the WDM device disclosed herein may be tuned by varying the grating strength and length while the channel spaced may be tuned by the angle of the two coated faces. Another advantage of these WDM devices is that they are not limited to any particular material or to a particular method of producing the gratings. The optimized diffraction efficiency may approach 100% and the wavelength resolution may reach subnanometer. Further distinct advantages of the present invention relates to the fact that the configurations disclosed herein use a simple strategy to multiply the wavelength channels without imposing added complexity on the diffraction structure. In addition to simplicity of implementation and high efficiency, the signal-to-noise ratio limited channel density and channel number of the present device is high. The insertion loss of the WDM device disclosed herein is about 10 dB.

It is significant to note that the embodiments described herein may be used with equal facility to form a multiplexed light beam. For this use, a plurality of light signals at selected wavelengths are directed through the transparent faces 18 and/or 20 at selected corresponding angles, and are diffracted by the volume diffraction phase grating 26 into the waveguide that forms an output beam 16.

The present invention has been described with respect to the preferred embodiments, namely a grating-in-two prism with two reflective faces fixed at a preselected angle with respect to each other. However, those skilled in the art will appreciate that the foregoing description of the preferred embodiments of the invention has been presented to illustrate the principle of the invention and not to limit the invention to the particular embodiment illustrated. It is intended that the scope of invention be defined by all of the embodiments encompassed within the following claims and their equivalents.

What is claimed is:

1. A wavelength division multiplexing/demultiplexing device, including:
   a pair of opposed reflective surfaces;
   means for directing a light beam having multiple wavelengths to be reflected multiple times between said reflective surfaces,
   volume diffraction grating means disposed between said opposed reflective surfaces, said light beam passing through said volume diffraction grating means at different angles upon each reflective traversal between said reflective surfaces;
   said volume diffraction grating means diffracting wavelengths at each traversal of the light beam that satisfy a Bragg condition and passing all other wavelengths;
   each traversal of the light beam through said volume diffraction grating means occurring at a respective different angle to cause diffraction of respective different wavelengths; and,
   a pair of prisms, each having one of said pair of opposed reflective surfaces.

2. The wavelength division multiplexing/demultiplexing device of claim 1, wherein said volume diffraction grating means is disposed between said pair of prisms.

3. The wavelength division multiplexing/demultiplexing device of claim 2, wherein each of said pair of opposed reflective surfaces comprise a respective internally reflective surface of one of said pair of prisms.

4. The wavelength division multiplexing/demultiplexing device of claim 3, wherein a first one of said prisms includes a first transmissive output face, and a first plurality of wavelength detectors disposed at said output face to receive a first plurality of wavelengths diffracted from said volume diffraction grating means.

5. The wavelength division multiplexing/demultiplexing device of claim 4, wherein a second one of said prisms includes a second trans missive output face, and a second plurality of wavelength detectors disposed at said second output face to receive a second plurality of wavelengths diffracted from said volume diffraction grating means.

6. The wavelength division multiplexing/demultiplexing device of claim 5, wherein said volume diffraction grating means is selected from a group consisting of a single Bragg diffraction grating, a multiple superimposed Bragg diffraction grating, and a binary Bragg supergrating.

7. The wavelength division multiplexing/demultiplexing device of claim 5, wherein each of said first and second plurality of detectors is positioned to receive one of said plurality of wavelengths.

8. The wavelength division multiplexing/demultiplexing device of claim 1, wherein said pair of prisms are refraction prisms.

9. The wavelength division multiplexing/demultiplexing device of claims 1, wherein said pair of prisms are dispersive to obviate polarization dependence.

10. The wavelength division multiplexing/demultiplexing device of claim 1, wherein one of said pair of prisms includes means for separating TE and TM polarized light, and the other of said prisms includes means to combine TE and TM polarized light, whereby said device is polarization independent.

11. The wavelength division multiplexing/demultiplexing device of claim 1, wherein said opposed reflective surfaces are parallel.

12. The wavelength division multiplexing/demultiplexing device of claim 1, wherein said means for directing a light beam includes a waveguide directed through one of said opposed reflective surfaces.

13. The wavelength division multiplexing/demultiplexing device of claim 1, wherein the index of refraction of said volume diffraction grating means has a predetermined change for each different angle of traversal of said light beam through said volume diffraction grating means.

14. A wavelength division multiplexing/demultiplexing device, including:
   a pair of opposed reflective surfaces;
   means for directing a light beam having multiple wavelengths to be reflected multiple times between said reflective surfaces,
   volume diffraction grating means disposed between said opposed reflective surfaces, said light beam passing through said volume diffraction grating means at different angles upon each reflective traversal between said reflective surfaces;
   said volume diffraction grating means diffracting wavelengths at each traversal of the light beam that satisfy a Bragg condition and passing all other wavelengths;
   each traversal of the light beam through said volume diffraction grating means occurring at a respective different angle to cause diffraction of respective different wavelengths;
   wherein the index of refraction of said volume diffraction grating means has a predetermined change for each different angle of traversal of said light beam through said volume diffraction grating means.

15. A method for wavelength division multiplexing demultiplexing, including the steps of:
   providing a pair of opposed reflective surfaces;
   placing a volume diffraction grating means between the opposed reflective surfaces;
   sandwiching the volume diffraction grating means between two prisms, each prism including one of the opposed reflective surfaces;
   directing a light beam having multiple wavelengths to be reflected multiple times between the opposed reflective surfaces, the light beam passing through the volume diffraction grating means upon each reflective traversal between the opposed reflective surfaces;

the volume diffraction grating means diffracting wavelengths at each traversal of the light beam that satisfy a Bragg condition and passing all other wavelengths;

each traversal of the light beam through said volume diffraction grating means occurring at a respective different angle and causing diffraction of respective different wavelengths.

16. The method for wavelength division multiplexing/demultiplexing of claim 15, further including the step of providing a waveguide to direct the light beam through one of the opposed reflective surfaces toward the other opposed reflective surfaces.

17. The method for wavelength division multiplexing/demultiplexing of claim 15, further including the step of selecting the volume diffraction grating means from the group consisting of a single Bragg diffraction grating, a multiple superimposed Bragg diffraction grating, and a binary Bragg supergrating.

18. The method for wavelength division multiplexing/demultiplexing of claim 15, further including the step of providing one of said pair of prisms with means for separating TE and TM polarized light, and the other of said prisms with means to combine TE and TM polarized light, whereby said device is polarization independent.

19. The method for wavelength division multiplexing/demultiplexing of claim 15, further including step of providing dispersive prisms to obviate polarization dependence.

20. The method for wavelength division multiplexing/demultiplexing of claim 15, further including the step of providing first and second transmissive output faces, each formed on a respective one of the pair of prisms.

21. The method for wavelength division multiplexing/demultiplexing of claim 20, further including the step of providing a first plurality of wavelength detectors disposed at the first output face to receive a first plurality of wavelengths diffracted from the volume diffraction grating means.

22. The method for wavelength division multiplexing/demultiplexing of claim 21, further including the step of providing a second plurality of wavelength detectors disposed at the second output face to receive a second plurality of wavelengths diffracted from said volume diffraction grating means.

23. The method for wavelength division multiplexing/demultiplexing of claim 15, further including the step of reverse operation by directing a plurality of input wavelengths toward the volume diffraction grating means to diffract the plurality of plurality of input wavelengths and form an output light beam.

24. A method for wavelength division multiplexing/demultiplexing, including the steps of:

providing a pair of opposed reflective surfaces;

placing a volume diffraction grating means between the opposed reflective surfaces, said volume diffraction grating means having a predetermined change in index of refraction for each different angle of traversal of the light beam therethrough;

directing a light beam having multiple wavelengths to be reflected multiple times between the opposed reflective surfaces, the light beam passing through the volume diffraction grating means upon each reflective traversal between the opposed reflective surfaces;

the volume diffraction grating means diffracting wavelengths at each traversal of the light beam that satisfy a Bragg condition and passing all other wavelengths;

each traversal of the light beam through said volume diffraction grating means occurring at a respective different angle and causing diffraction of respective different wavelengths.

* * * * *